United States Patent [19]

Gladstone et al.

[11] 3,770,555
[45] Nov. 6, 1973

[54] PARTIALLY CURED PREFORMED FILM AND ITS USE IN JOINING OVERLOPPED ENDS OF A COATED ABRASIVE ARTICLE

[75] Inventors: Matthew T. Gladstone, Scotia; John F. Malloy, Waterford, both of N.Y.

[73] Assignee: Norton Company, Troy, N.Y.

[22] Filed: June 14, 1971

[21] Appl. No.: 152,694

[52] U.S. Cl..................... 161/36, 51/298, 156/137, 156/153, 156/306, 156/331, 161/145, 161/190, 260/77.5, 260/858
[51] Int. Cl.... B32b 3/10, C08g 22/00, B32b 27/40, C09j 7/00, C08g 51/12
[58] Field of Search..................... 161/145, 190, 36; 156/137, 153, 157, 309, 331, 306; 260/835, 858, 77.5 AM, 77.5 NP; 51/298

[56] References Cited
UNITED STATES PATENTS
3,660,523  5/1972  Grawe et al................ 260/77.5 AM Primary Examiner—Philip Dier
Attorney—Hugh E. Smith et al.

[57] ABSTRACT

An adhesive composition, which in the preferred aspects of the invention is a partially cured reaction product thereof in the form of a dried, heat-activatable, preformed film, is provided comprising in admixture a component having available free isocyanate groups and a poly-functional active hydrogen containing component consisting of, in combination, a hydroxyl terminated polyurethane polyester and a member containing at least difunctional active hydrogen having an active hydrogen equivalent weight of at least about 27 and less than about 500. The partially cured, preformed adhesive film, interposed between two surfaces to be joined together permits joint formation under pressure, at relatively low temperatures, thereby making it possible to join together various materials which would otherwise present a problem in joining because of their lack of heat resistance.

19 Claims, 3 Drawing Figures

PATENTED NOV 6 1973 3,770,555

Inventors:
Matthew T. Gladstone;
John F. Malloy,
by Herbert L. Gatewood
Their Attorney.

PARTIALLY CURED PREFORMED FILM AND ITS USE IN JOINING OVERLAPPED ENDS OF A COATED ABRASIVE ARTICLE

BACKGROUND OF THE INVENTION

1. Field of the Invention

This invention relates to an adhesive composition and more particularly to a dried, partially cured heat activatable preformed adhesive film, to its method of manufacture, and its use in the joining together of two adjacent surfaces. Even more particularly, it relates to the splicing together of two free ends of coated abrasive material and, still more particularly, to the splicing of such material as in the formation of endless abrasive belts.

2. Description of the Prior Art

Coated abrasive belts are manufactured, in general, by adhesively securing together the free ends of strips of coated abrasive sheet material of a suitable length and width. The demands on an adhesive used in the formation of such endless belts are severe as a coated abrasive belt during use is subjected to relatively high tensile and flexural forces. Thus, any adhesive composition used in the formation of abrasive belt joints must be tough and durable, in addition to providing good adhesion (high peel strength) with the abrasive material, to prevent delamination of the belt joint upon being subjected to severe flexing conditions, especially when running over a small diameter contact roll. Moreover, the adhesive used in forming the joint must often be resistant to heat, water, lubricants, and other cutting fluids encountered in abrading operations. Over the years, the manufacture of coated abrasive belts has involved, by and large, the use of liquid adhesive compositions. These compositions, for the most part, have involved glue or other water-soluble adhesive material in water. However, where resistance to cutting fluids, water, and heat has been desired, resinous types of adhesives have been used. These latter adhesive materials, among others, include phenol formaldehyde resins, epoxies and polyurethanes in a suitable solvent or carrier therefor.

Although liquid adhesive compositions have long been used in the manufacture of abrasive belts, their use is attendant with certain disadvantages in addition to involving messiness and errors in preparation and use from operator to operator. One disadvantage associated with the use of a liquid adhesive composition is that such, in general, requires a "dwell time" for, among other things, the removal of solvent. Thus an operator must apply the adhesive composition to the surface or surfaces to be joined, wait for a certain period of time to pass in order for the solvent to evaporate and, in some instances, for the adhesive material to cure to some desired point, before joining the ends together for joint formation. Curing of some adhesive materials to some degree before joining the adhesive coated surfaces together is absolutely necessary in order that an inordinate amount of time is not taken, e.g., for a press curing cycle and, most importantly, so that the adhesive material will have sufficient cohesive strength prior to pressing that it will not be squeezed out during pressing thus resulting in an adhesive starved joint area and therefore a joint with inferior bond strength. On the other hand, the "open time" or "permissible dwell time," during which the faying surfaces can be adhesively assembled together and a satisfactory bond achieved, must also be observed by the operator. While it is sometimes possible for an operator to coat other abrasive strips for belt formation during the dwell time, thus setting up a situation where abrasive belts can be somewhat continuously formed, such a procedure is often confusing to the operator. Oftentimes the adhesively-coated abrasive strips, for one reason or another, are improperly kept account of thus resulting in some adhesive compositions not receiving the "required dwell time" and others receiving too much, i.e., exceeding the "permissible dwell time." The result in either instance may be formation of an inferior belt joint.

A further disadvantage associated with the use of a liquid adhesive composition results from the fact that different operators, in preparing the coated adhesive ends for belt formation, invariably apply more or less of the adhesive composition than is required for optimum results. Moreover, in some instances, the adhesive composition, to provide a layer of adhesive material sufficiently thick for provision of suitable bond strength, must be applied in multiple coats because application of a thicker layer by means of a more viscous composition is not possible.

Because of the nature of a liquid adhesive composition and its manner of preparation and application, the quality of a joint formed therewith often varies somewhat, even from belt-to-belt. This lack of uniformity in the manufacture of endless coated abrasive belts is naturally accompanied by complaints from users of the belts. As a result, over the years, various adhesive compositions have been developed for use in belt manufacture whereby to provide better quality control. Nevertheless, the problem of obtaining belt joints with more satisfactory and uniform physical characteristics has remained.

Rather than using liquid adhesive compositions in laminating operations, some have suggested the use of preformed adhesive films. Prior art exemplary of these adhesive films are U.S. Pat. Nos. 2,060,906; 2,778,169; 2,794,726; 3,406,053; and 3,449,280. These adhesive films have been suggested for use in the bonding together of various lamina and, moreover, have even been disclosed for use in the formation of endless coated abrasive belts, e.g., U.S. Pat. Nos. 2,778,169 and 2,794,726. However, of the preformed adhesive films commerically available or which have been suggested for use, of which we are aware, none have heretofore, completely satisfied the requirements for the manufacture of joints in coated adhesive belts.

In the case of some preformed adhesive films suggested heretofore, the films cohesive or adhesive qualities, inferior heat resistance, etc., would result in a joint incapable of withstanding the rigorous application to which abrasive materials are subjected. Other preformed adhesive films of which we are aware require an excessive curing time or too high a curing temperature to be used at all in the manufacture of coated abrasive belts. Some adhesive films while suitable for the manufacture of endless belts of certain materials, are unsuitable, because of their press joining temperature, for the manufacture of coated abrasive endless belts of other materials.

An adhesive composition in the form of a dry, tack-free, heat activatable, partially cured, preformed film which has been found to provide improved belt joints as well as an improved method of manufacture of abrasive belts is disclosed in application Ser. No. 34,105, filed May 4, 1970. Therein, John F. Malloy, one of the co-inventors herein, discloses an adhesive film comprising the reaction product of a composition comprising in admixture of hydroxyl terminated polyurethane-polyester and a component having available free isocyanate groups. These adhesive compositions are partially cured subsequent to film formation and are cured ultimately by reaction with moisture present, e.g., in the air. As can be readily observed, ultimate curing is difficult to control consistently with varying relative humidity and, moreover, requires relatively prolonged curing time. Thus, prior to using an abrasive belt wherein such an adhesive film is used, it is necessary, to make certain the joint will not delaminate, to condition the belt joint for several hours thereby permitting the joint strength to be increased (moisture cure) to a satisfactory level. Moreover, for some unknown reason, the initial joint strength, i.e., on immediate removal from the press, has been found satisfactory for further processing and handling in some instances and unsatisfactory in others.

SUMMARY OF THE INVENTION

In accordance with the general aspects of our invention, we have discovered an adhesive composition which can be provided in the form of a partially cured, heat activatable, preformed film, which has a relatively low press joining temperature thus making it possible to use the adhesive film in the bonding of a wide variety of coated abrasive materials, and most importantly, which provides a joint of sufficient strength initially on manufacture that coated abrasive belts can be handled immediately and further processed on their removal from the press without need for further curing. Of advantage also, with the adhesive film of our invention, initial joint strength is sufficient that, at least in some applications, an abrasive belt can, if desired, be used immediately after its manufacutre and without need for conditioning to ultimate strength.

The adhesive film used in the practice of this invention basically comprises the partially cured reaction product of a composition comprising in admixture a component having available free isocyanate groups and a polyfunctional active hydrogen containing component consisting of, in combination, a hydroxyl terminated polyurethane polyester and a member containing at least difunctional active hydrogen and having an active hydrogen equivalent weight in the range from about 27 to less than about 500.

Use of such a dried, partially cured, preformed film as disclosed herein makes it unnecessary during belt manufacture to allow for a dwell time during which solvent is evaporated and whereby cure may be advanced to a degree resulting in cohesive strength satisfactory for joining.

A further, and most important, advantage offered in the practice of our invention is that coated abrasive belts of more uniform quality and physical characteristics can be manufactured repetitively thus providing customer satisfaction. This results from a combination of factors. Among these is the fact that not only does an operator need not be concerned with some minimum dwell time but the same adhesive composition as well as amount thereof is always provided in the manufacture of belts of any particular coated abrasive material. Thus, no room is left for varying joint properties due to improper preparation of a composition or application by an operator of more or less adhesive composition than has been determined previously to be desirable.

Using a dried, preformed, adhesive film, rather than a liquid adhesive composition, makes unnecessary the messy means of application, e.g., by brushing, etc., thus resulting in better housekeeping, and less waste of adhesive composition. A dried, adhesive film is further desirable in that in its use no obnoxious solvent is evaporated in the belt making area thus making special ventilation unnecessary and, moreover, reducing pollution of the atmosphere.

Quite advantageously our invention makes it possible to substantially automate the manufacture of coated abrasive belts. Thus, increased efficiency in belt manufacture, as well as a more uniform and reliable product of higher quality, is made possible.

BRIEF DESCRIPTION OF THE DRAWING

The invention will be better understood by referring to the drawing in which like numerals refer to like parts in the various views and in which.

DETAILED DESCRIPTION OF THE INVENTION AND PREFERRED EMBODIMENTS

Figure 1:
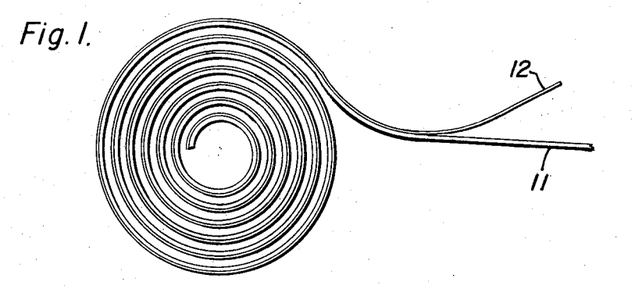
FIG. 1 is an end view of a roll of preformed adhesive film in accordance with our invention.

Turning now to the drawing, there is disclosed in FIG. 1 thereof, in accordance with the invention, a roll 10 of dry, tack-free, heat-activatable, at least partially cured, preformed adhesive film 11 on release liner or carrier 12.

Figure 2:
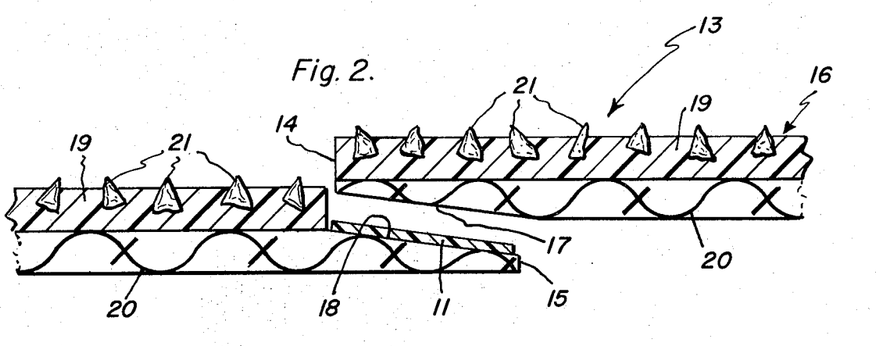
FIG. 2 is a view in cross-section, greatly enlarged, showing the formation of a joint in an endless coated abrasive belt.

In the most preferred aspect of the invention, adhesive film 11 is used in the formation of a joint in the manufacture of an endless coated abrasive belt 13. As shown in FIG. 2, in the manufacture of such a belt, the free ends 14, 15 of a strip 16 of coated abrasive material are superposed in overlapping manner and joined together by the preformed adhesive film 11. These ends in the drawing are shown out of contact with one another and end 14 with adhesive film 11 for sake of clarity. It will be understood by those skilled in the art that the thickness of adhesive film 11, as shown in the drawing, as well as that of the coated abrasive material is exaggerated to better show the invention. It will also be readily understood that, in a completed belt joint, surfaces 17, 18 of belt ends 14, 15, respectively, will be closely adjacent one another and secured together by means of preformed adhesive film 11. In a completed joint, it will, of course, not be possible to discern that the joint adhesive was initially a preformed film.

The preformed adhesive film 11, used in the practice of the invention, is the dried, partially cured, heat activatable, reaction product of a polyurethane adhesive composition. As is well known, with such compositions, the essential components thereof are an isocyanate and an isocyanate reactive compound, i.e., a polyfunctional active hydrogen-containing component. We have discovered, quite advantageously, that more satisfactory results will be obtained with a polyurethane adhesive composition wherein the poly-functional active hydrogen-containing component consists of, in combination, a hydroxyl terminated polyurethane polyester having a hydroxyl number of from about 2 to about 15 and a member containing at least difunctional active hydrogen and having an active hydrogen equivalent weight in the range from about 27 to less than about 500, most preferably from about 67 to about 300.

Hydroxyl terminated polyurethane polyesters, as is well known, are, in general, prepared by reacting a molar excess of a hydroxyl terminated polyester with a suitable polyisocyanate. Many such polyesters useful for reaction with polyisocyanates are known and are commerically available. They are formed by esterifying and polymerizing a dibasic or polybasic carboxylic acid, or mixtures of these acids, with a complementary bi- or poly- functional compound containing more than one alcoholic group or mixtures of these compounds. Suitable acids for reaction to form polyesters, which primarily should be saturated acids, include succinic, glutaric, adipic, pimelic, maleic, azelaic, sebacic, diglycolic, and dimer linoleic, and mixtures of these. Examples of polyhydric alcohols include ethylene glycol; propylene glycol; butylene glycol; diethylene glycol; 1,5 - pentanediol; and hexamethylene glycol. Small proportions of a polyhydric alcohol such as glycerol, castor oil and trimethylol propane may also be used. The reaction of these materials to form polyesters ordinarily involves a simple heating for a few hours, usually with removal of water formed during reaction by maintaining a vacuum over the reaction mixture. The acid and alcohol are combined in proportions providing a substantial excess of hydroxyl groups over acid groups and the reaction is carried to a point giving a product having hydroxy groups, preferably terminal, with a hydroxyl number from about 30 to about 140, preferably 50-60, an acid number 0-12, and a molecular weight between about 2,000 and 4,000.

Reaction of the polyesters with the polyisocyanates involves mixing one or more polyisocyanates with one or more polyesters and heating the mixture until the reaction is substantially complete. The reacted material is then cooled to solidify it and broken up for convenience in handling. Arylene diisocyanates such as 2, 4-toluene diisocyanate; 1, 5-naphthalene diisocyanate, and m-phenylene diisocyanate are preferred because of toxicity problems with aliphatic isocyanates but aliphatic isocyanates such as hexamethylene diisocyanate or pentamethylene diisocyanate may be used along with or in place of the arylene diisocyanate if proper health precautions are taken. The isocyanate and polyester are combined in relative proportions of about 0.9 to about 1.4 mols of diisocyanate per mol of polyester.

Such a polyurethane polyester elastomer, as is desired in the practice of our invention, is available commercially in solvent solution from United Shoe Machinery Corporation. One such a solution is identified as "Bostik 7070" in their bulletin BA20, page 4. "Bostik 7076" is comparable except that a mixture of acetone-toluene is used as the solvent rather than ethyl acetate. The solvent used is of no consequence and other solvents or diluents suitable as a vehicle for the polyurethane elastomer can be used. Merely by way of example, methyl ethyl ketone may be used, if desired. The polyurethane polyester in "Bostik 7076" is believed to be the reaction product of toluene diisocyanate with a hydroxyl terminated polyester of adipic acid and butylene glycol.

The other active hydrogen containing member or component may, in general, be any compound containing at least difunctional active hydrogen in the form of —OH, —SH, —NH—, and —NH$_2$ so long as the active hydrogen equivalent weight of such compound is in the range from about 27 to less than about 500 preferably from about 67 to about 300. When one desires longer film shelf life, a higher equivalent weight member will be used. Typical such compounds which may be used in the practice of the invention include Phenoxy PAHJ, a thermoplastic high molecular weight epoxy with secondary hydroxyl groups available from Union Carbide Corporation, Fomrez-50, a linear polyester resin having a hydroxyl number of about 50 available from Witco Chemical Company; MOCA, 4, 4' methylene-bis-(2 chloroaniline) available from E. I. DuPont de Nemours & Co.; 1, 4-butane diol; polyoxypropylene diamine available from Jefferson Chemical Co. under the trade designation Jefferson D230; Thylon D-406, a polyester-polyurethane isocyanate blocked prepolymer available from Thiokol Chemical Corporation; and Unithane 200, a polyetherpolyurethane isocyanate blocked prepolymer also available from Thiokol Chemical Corporation. The last two mentioned active hydrogen containing components are believed disclosed in U.S. Pat. Nos. 3,228,820 and 3,252,848.

Active hydrogen containing compounds which will not be found satisfactory include, for example, aliphatic diamines such as diethylene triamine, ethylene diamine, and triethylenetetramine. With these compounds, polymerization is so promoted that in the adhesive composition localized gelation occurs almost immediately on mixing the compound with the other components thus making it impossible to cast a film thereof. On the other hand, active hydrogen compounds having an active hydrogen equivalent weight above about 500, e.g., BOSTIK 7076 are so slowly reactive with the isocyanate that polymerization of the adhesive film is not adequately promoted to result in a joint of the desired initial strength for handling. Monofunctional compounds such as water and methanol, which have active hydrogen equivalent weights of 9 and 32, respectively, liberate carbon dioxide which makes then undesirable as polymerization promoters and, moreover, their reaction with isocyanate is undesirably slow.

The isocyanate component utilized in the practice of the invention is not critical so long as it has available sufficient free isocyanate groups to react satisfactorily with the reactive hydrogens and thus cure the adhesive composition. Any organic diisocyanate or polyisocyanate such as triisocyanates and tetraisocyanates, or mixture of diisocyanates, polyisocyanates, or both may be used. Merely by way of example, toluene diisocyanate, p, p-diphenylmethane diisocyanate, polyphenyl polymethylene polyisocyanate, triphenyl methane triisocyanate, and the like may be used. As will be appreciated, the particular diisocyanate or polyisocyanate used must be either soluble in the solvent used for the active hydrogen members or dissolved in a solvent compatible therewith. An isocyanate material meeting these requirements and found particularly suitable in the practice of the invention is a product available commerically under the trade designation Mondur CB-75 from Mobay Chemical Company. This product, a polyurethane prepolymer in solution, is described in Urethane Coating, Second Edition, published by Mobay and is the reaction product of trimethylol propane and toluene diisocyanate.

As the ultimate curing of the adhesive composition used in the manufacture of the adhesive film, hereinafter more fully described, depends upon the number of (—NCO) groups present in the isocyanate component, the amount of isocyanate component required depends, of course, on the amount of and particular combination of active hydrogen members used in the adhesive composition, as well as upon the particular isocyanate used. In general, however, and by way of example, a joint of satisfactory initial strength, as well as one of ultimate strength, will be obtained, where the hydroxyl terminated polyurethane elastomer is Bostik 7076, with from about 4.7 to about 12.5, preferably 4.8 to about 6.8, parts Thylon D–406 and from about 4.4 to about 15 parts Mondur CB–75 per 100 parts Bostik 7076. Where the amount of Thylon D–406 is less than above indicated, curing is not sufficiently promoted to give a joint within the time desired of the desired strength. Use of greater amounts of Thylon D–406 result in a film too heat resistant to permit heat activation thereof at temperatures found most suitable for belt joint formation. The amount isocyanate component, stated in still another way, can be from about 0.54 gram (—NCO) to about 7.5 grams (—NCO) per 100 grams polyurethane polyester solids, preferably 1.05 grams (—NCO) to about 4.3 grams (—NCO). From this, one can determine readily from a few simple experiments in the laboratory what amounts of the various components will be found suitable in other compositions for optimum results.

Preformed adhesive film 11 may be, in general, manufactured from the adhesive composition according to any usual film forming techniques. One such technique involves casting a suitable amount of the adhesive composition on a so-called release liner or carrier 12 to result in, depending on the amount of solvent in the composition, the film thickness desired after solvent evaporation. Such release liners are well known and several are available commerically, e.g., a polyethylene coated paper or a paper coated with a silicone resin, polytetrafluoethylene, or the like. The adhesive composition is, in the practice of the invention, applied to release liner 12 by means of either a knife on roll or reverse roll coating procedure. Afterwards, the wet, adhesive coated-release liner 12 is heated for a sufficient period of time and at a suitable temperature for the solvent to evaporate from the adhesive composition to provide a dried, tack free, adhesive film and one that is partially cured and heat activatable. The film thus formed, to provide adquate bond strength when used in a coated abrasive belt joint, should be at least about 1.5 mils thick. Desirably the dried, heat activatable, preformed adhesive film is from about 2 to about 4 mils thick. A thinner film results in poor bond strength and a thicker film makes for too thick a joint thus resulting in bumping and chattering of an abrasive belt during use.

The layer of adhesive composition obviously may be dried by various well known means. We have found that satisfactory drying may be readily accomplished in a conventional hot air oven. Various types of such ovens are available commerically. Ovens which provide a flow of air counter-current to the direction of travel of the wet film are preferred for continuous manufacture of the film adhesive. The temperature and time relationship required for heating will, of course, depend on a number of factors including the particular components in the adhesive composition. This relationship should provide, however, for substantially complete solvent removal as well for reaction of the components in and some partial curing of the adhesive film composition. The degree of partial curing desired may vary, depending somewhat on the specific application for the particular film adhesive, as well as the composition thereof. In general, however, the film adhesive should not be cured to such an extent that, on heating in a press, e.g., in the formation of abrasive belts it cannot be heat activated, i.e., merely be softened and tackified. The extent of partial curing should, however, provide sufficient cohesive strength in the adhesive film that it will not unduly flow on application of heat and pressure. With curing such as desired in the practice of our invention, the preformed adhesive film will, on application of heat and pressure, flow into intimate contact with the surfaces to be joined yet not be squeezed out from therebetween. Of advantage, partial cures have been found satisfactory which result in an adhesive film which can be heat activated at temperatures, e.g., less than about 275°F, above which damage could result to a conventional coated abrasive backing member.

A desirable partial cure may be obtained in general in heating a film, which initially may be from about 20 to about 30 percent solids, these solids comprising (by weight) from about 64 to about 98 percent hydroxyl terminated polyurethane, from about 0.4 to about 20.2 percent active hydrogen member, and from about 3.5 to about 36.5 percent isocyanate, after solvent removal, for from about 10 to about 60 minutes at from about 300°F to about 250°F. The adhesive film should not, however, be cured to such an extent that it is not flowable or cannot be tackified with conditions of pressure and heat found desirable in the manufacture of coated abrasive belt joints.

Subsequent to formation of the adhesive film, where continuously manufactured, the adhesive film-carrier combination may then be wound into rolls. Afterwards, or before if desired, the combination may be slit into widths of the desired size and wound into rolls of suitable length for use. The adhesive film composition continues curing (moisture from atmosphere, backing member, etc.) even at room temperature. However, the rate of curing is relatively slow and can be retarded even further by storing the rolls of adhesive film, in sealed plastic bags, e.g., of polyethylene in each of which is desirably contained a desiccant such as "Drierite" (anhydrous calcium sulfate), at relatively low humidity and temperature. Provided the adhesive film is stored in a dry atmosphere, e.g., about 0–5 percent relative humidity (R.H.) at 5°F or less, these films can be used and satisfactory bonds achieved in belt joints even after storage life of up to about 9 months. Once the adhesive film is removed from the controlled conditions of low temperature and humidity, it must be used generally in from about 4 to about 16–24 hours depending on atmospheric conditions. Thus, an adhesive film has a pot life outside the controlled environment of only about 4 hrs. at 85°F, 65 percent humidity (R.H.); however, a film of the same composition has a pot life of about 16–24 hours at 75°F, 25% R.H.

In the practice of our invention, when the adhesive film 11 is to be used immediately, it need not be packaged. Otherwise, however, it is desirably packaged and stored as above-disclosed. When required for the manufacture of belt joints, a suitable number of packages of the adhesive film, for relatively immediate use, is removed from the controlled environment. Coated abrasive strips, referred to in the drawing by numeral 16, of a suitable width and length are provided and the ends 14, 15 of the abrasive strips are prepared for belt formation according to usual techniques. An appropriate length of adhesive film-carrier combination 11, 12 is unwound from a roll 10 thereof, is applied to the skived surface 18 of coated abrasive strip 16 which previously has been positioned as usual on the bottom bar or platen press and, is then cut off. Quite obviously, the length of adhesive film-carrier can be cut from the roll before application, if desired. A press found suitable in the practice of the invention is one in which both the upper and lower platens are capable of being heated electrically and is capable of exerting a pressure of up to 30 tons on an object located therebetween.

Coated abrasive strip 16 with the partially cured, heat activatable adhesive film 11 - release liner 12 thereon (liner on outside) is then subjected to light pressure, e.g., about 200 – 400 lbs./in.$^2$ while being heated by the bottom bar only (e.g., about 175°–350°F) for about 1 – 5 seconds. Thus, the adhesive film is heat activated, i.e., softened and tackified in preparation to forming the belt joint. On release of the pressure and withdrawal of the upper bar, the release liner is removed. The ends 14, 15 of coated abrasive strip 16 are then overlapped as shown in FIG. 2, and the overlapped ends are then subjected to heat and pressure as above-mentioned. After this heat-activation, the coated abrasive strip ends - film adhesive assembly is then positioned in a similar press and the joining of the two ends is completed. In the practice of our invention, two presses are desirably used. This permits a smoother operation in that one press can be used for activation of the adhesive film while the other can be used for joint formation. However, quite obviously a single press, if desired, can be used to accomplish both operations. Moreover, rather than using a heat activation cycle, activation can be accomplished without external heat with very high pressures, e.g. about 10 ton per square inch.

During the press joining cycle, i.e., the joining of the superposed, overlapped coated abrasive ends, both bars are heated. Thus, the adhesive film is subjected to pressure while simultaneously being heated from both sides. In this way a joint is formed of strength sufficient to permit immediate handling of the belt on removal from the press. Not only can the belt so manufactured be further processed, e.g., cutting to lesser width, if desired, or packaged immediately on cooling but it can be also used immediately in some abrasive applications. Quite advantageously, the critical joint strength in this invention, it has been found, is from 5–15 times greater than the initial joint strength in a joint using a similar film adhesive composition but without the combination of active hydrogen members disclosed herein.

The pressure used in joining may be varied as desired, e.g., from about 1,500 lbs./in.$^2$ to about 12,000 lbs./in.$^2$. In general the time and temperature required to effect optimum joint strength whereby to obtain suitable handling strength of the abrasive belt for any particular adhesive composition will, of course, vary with each particular adhesive composition. Somewhat better joints have been made by using elevated temperatures within the range from about 175°F to about 350°F, a preferred temperature range being about 240°F to about 335°F for from about 5 seconds to about 30 seconds.

Ultimate or maximum joint strength depends somewhat on atmospheric conditions; however, this strength is obtained substantially within 24 to 48 hours of belt manufacture at 70°F, 50% R.H. On the other hand substantially maximum joint strength is obtained in about 8 to 16 hours, at 85°F, 65% R.H. Ultimate joint strength is obtained from further curing of the partially cured polyurethane reaction product formed with atmospheric moisture. On the average, the joint strength obtained initially, i.e., the strength of the joint on removal from the press is only about 50–75 percent that of the ultimate joint strength.

In the practice of our invention it is preferred, as shown, that surfaces 17, 18 in accordance with usual techniques, be beveled by abrading and skiving, respectively. Thus, a narrow area is delimited adjacent each free end 14, 15 of the abrasive strip 16 for application of the adhesive film. Moreover, this makes for better adhesion, and lesser joint thickness. In general, in skiving the upper portion of end 15 it is preferred to remove all the maker adhesive 19 hereinafter described, from the skived area. A taper, as shown, of 2–3 mils is desired from the trailing edge of the skived portion to the leading edge thereof. The lower surface 17 of end 14 can be back rubbed, wire brushed, sand blasted, or the like to provide a roughened area matching with the skived area on end 15.

The coated abrasive sheet material used in the practice of my invention is of conventional manufacture and forms no part of the invention per se. In general, the abrasive material comprises a backing member 20, and abrasive grain 21 secured to the backing member by means of an adhesive bond or maker 19.

Backing member 20 can be of any material conventionally used in the manufacture of coated abrasive sheet material. This includes paper, cloth, vulcanized fiber, and the like sized with various materials depending on the end use for the coated abrasive product. The sizing and filling materials may be starch, glue, filled or otherwise as desired, or of a resinous material such as phenolformaldehyde.

The bonding layer or maker coat 19 can be of a resinous material such as e.g., phenol-formaldehyde, epoxy resin, and the like. However, quite advantageously, our invention can also be used with an animal glue maker adhesive composition. The bonding layer may include a sand size coat of the same composition as the maker or not, as desired. Where the sand size coat is of a heat hardened resinous material, the maker adhesive coat can be of either glue or resinous material.

Abrasive grains 21 can be of any of those grain materials, natural or synthetic, used conventionally in the manufacture of coated abrasive sheet material. These include flint, emery, garnet, silicon carbide, aluminum oxide, and zirconia-alumina grains of any size.

Figure 3:
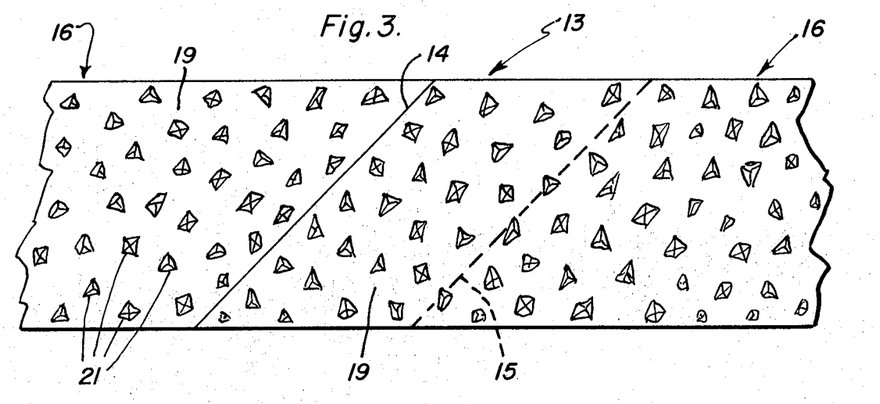
FIG. 3 is a plan view, in part, of a completed endless abrasive belt.

Abrasive strip material 16, as is usual, preparatory to formation of an abrasive belt is cut to the desired width and length from a suitable coated abrasive sheet material. The free ends 14, 15 of the coated abrasive strip, according to conventional techniques, are preferably cut at an angle, e.g., from 30° to 75°, with respect to the lengthwise direction, as more clearly shown in FIG. 3 of the drawing. A preferred angle is 55°. However, if desired, the cut can be made normal to the lengthwise direction.

The following examples, which are given for puroses of illustration only and are not intended to be limiting of the inventive concept, will more clearly illustrate the preferred embodiments of the invention. All parts are by weight (pbw) unless otherwise indicated.

Example 1

An adhesive composition was prepared by blending together the components shown below:

| Components | Parts By Weight |
|---|---|
| BOSTIK 7076 (20% solids in acetone-toluene solvent) | 100 |
| MONDUR CB-75 (75% solids in ethyl acetate) | 8.8 |

Mixing was conducted at room temperature over a period of about 15 minutes. Afterwards, the adhesive composition, in which the above components are uniformly dispersed, was deposited, according to usual roll coating techniques, onto a silicone release paper. Such a paper (48 inches wide) is commerically available under the trade designation "Silicone Release Liner No. 662" from Weyerhaeuser Company.

The adhesive coated release paper was then festooned and passed through a conventional hot air oven at 17 feet per minute. Therein, the adhesive layer was heated by a counter current flow of air for 15 minutes at 100°F followed by 30 minutes at 250° F. A dried, tack-free, partially cured, heat activatable, preformed adhesive film having a thickness of about 3 mils resulted.

The thus-formed adhesive film-carrier combination was then slit by usual techniques to provide an adhesive film-carrier combination three-eighths inches wide. Afterwards, this combination was wound into rolls of suitable length (300 feet) for use in the manufacture of coated abrasive belts. Some of the rolls of adhesive film were packaged, as before described, and stored for subsequent use.

Example 2

A strip of 80X RESINALL METALITE coated abrasive material (6 inches × 60 inches) was prepared for formation of an endless belt. The abrasive surface of one end of the abrasive strip was skived by usual techniques thereby removing the abrasive material and the bonding layer and leaving exposed the upper portion of the backing member. The skived surface (3/8 × 7.5 inches) was at an angle of about 55° with respect to the lengthwise direction of the abrasive strip and was slightly tapered, from trailing edge to leading edge thereof, at an angle of about 5° with respect to the horizontal.

A suitable length of the film adhesive-carrier combination, manufactured as in Example 1, was withdrawn from a roll thereof and was cut into a length and shape complementary to the skived area. The dried, heat activatable, adhesive film was then positioned directly on the skived surface, the strip of abrasive material having been positioned previously on the bottom bar of a conventional platen press.

The upper bar of the press was then brought into contact with the release liner, a pressure of about 387 psi being exerted on the adhesive film-carrier combination and skived abrasive end. This pressure was held for a period of about 3 seconds while the film-abrasive material was being heated solely by the bottom bar having a surface temperature of about 275°F. Thus, the adhesive film was softened and tackified in preparation for the subsequent bonding step.

Next, the pressure was released and the upper bar was withdrawn from contact with the release liner. The release liner was then removed from the heat activated, i.e., softened and tackified adhesive film. The bottom surface of the other end of the coated abrasive strip, which in accordance with usual practice had been roughened and slightly tapered in an area complementary to the skived area, was then positioned in contact with the upper surface of the activated adhesive film.

The overlapped coated abrasive strip-adhesive film assembly was then again pressed while being heated only by the lower bar. A pressure of 387 lbs/in$^2$ was maintained for 3 seconds (bar temperature 275°F.) after which it was released and the upper bar was slightly withdrawn. The coated abrasive strip-film adhesive assembly was then removed from the press and was positioned in a similar press and the upper bar therein was brought into contact with the overlapped portions of the coated abrasive strip with a pressure of 6,500 lbs./in$^2$. This pressure was maintained while the assembly was heated by both bars for about 20 seconds (bar temperatures 240°F). Afterwards, the pressure was released and the thus produced abrasive belt was removed from the press.

On visual examination, the abrasive belt was observed to have a joint thickness not substantially greater than the thickness of the coated abrasive material per se. Moreover, the belt joint was observed to be much neater looking than those generally manufactured using a liquid adhesive composition there being no excess adhesive composition on the abrasive or backside of the belt joint.

The coated abrasive belt thus produced was tested in accordance with ASTM D902–49 except that a specimen size of 1 × 5 inches was used at a separation rate of 5 inches per minute and the belt was conditioned for 24 hours, prior to testing, at 70°F, 50% R.H. During this period, the adhesive cures (moisture) and the joint obtains substantially optimum strength. The joint in this test was determined to have an adhesion peel strength in excess of 15 pounds/in. of joint width.

On subjecting a belt joint thus manufactured and so conditioned to severe and continuous flexing in the immediate area of the belt joint on a multi-head oscillating flex fatigue tester, the belt joint was found to exceed 4,000 flexes before failure occurred. In this test, a strip of coated abrasive material (½ × 18 inches) including the joint is held under tension (36 lbs./in. width) and the abrasive material is moved back and forth at 200 cycles per minute in a 90° change in direction over a ¼ inch diameter roll. This test is particularly directed at producing delamination failure in the adhesive joint. A belt joint which will withstand 2,400 flexes without failing has been considered good in the past.

Example 3

An adhesive composition was prepared similar to that disclosed in Example 1.

| Components | Parts By Weight |
|---|---|
| BOSTIK 7076 | 100 |
| MONDUR CB-75 | 8.8 |

A layer of this adhesive composition was cast on a release liner after which the wet coated release liner was then heated in a Despatch Electric Oven for 40 minutes at 250°F. This resulted in a 3 mil dry, tack-free, partially cured, heat activatable, adhesive film.

Preformed adhesive films, thus manufactured, were used in the manufacture of belt joints (120X RESINALL METALITE abrasive cloth) in the manner disclosed in Example 2 except that the joint angle was 70° and joining was conducted at 7,200 lbs. per in.$^2$.

In contrast to Example 2, these joints were tested in the multi-head tester after only a 2 hour dwell (time after formation and removing from press) under room conditions (72°F, 40 percent R.H.). The results were as follows:

| JOINT | MINUTES TESTED | NUMBER OF FLEXES | JOINT CONDITION |
|---|---|---|---|
| 1 | 0.4 | 80 | Film Split |
| 2 | 0.6 | 120 | Film Split |

Thus, in comparison to the results in Example 2, the necessity for conditioning (post curing) of the joint adhesive after manufacture of the joint is clearly shown. Without conditioning, joint delamination or damage often results from excessive handling on removal from the press or when slitting to smaller size belts.

Examples 4–12

An adhesive composition was prepared similar to that disclosed in Example 1 except that it also included in combination with the polyurethane polyester component varying amounts of another member containing active hydrogen, such member having an active hydrogen equivalent weight much lower than the hydroxyl terminated polyurethane elastomer. Although in this particular instance Thylon D-406 was added to the mixture of Mondur CB75 and Bostik 7076, there is nothing critical about the manner in which the components are mixed together.

Adhesive films were prepared from the various compositions in the manner disclosed in Example 3. Joints were formed as before (120X RESINALL METALITE abrasive cloth) and were evaluated (dwell time about 15–30 minutes after removal from press) in the multi-head oscillating flex fatigue tester. The results are given below.

These data, it is believed, indicate clearly the advantage of including in the adhesive composition an active hydrogen member having an active hydrogen equivalent weight less than the hydroxyl terminated polyurethane. Thus, in Example 11, 12, when in effect increasing the amount BOSTIK in the adhesive composition and therefore the amount of an active hydrogen component therein, the improvement in initial joint strength shown over the joint in Example 3 was relatively small compared with the rather dramatic improvement shown in Examples 4, 5, 8, 9, and 10.

In belts manufactured in the same manner and tested after conditioning 16–24 hours, 50% R.H., 70°F, these belts have been found to exceed 8,000–12,000 flexes before joint failure. Initial joint strength on the other hand has been found to vary from 4,000–6,000 flexes before failure.

When belts are manufactured using adhesive films, of polyurethane compositions including the combination of active hydrogen members disclosed herein, these belts can be handled and further processed, e.g., slitting into smaller widths, etc., immediately on removal from the press without danger of joint delamination. Thus reduced valuable time and expense in manufacturing is obtained in that belts manufactured in accordance with our invention need not be conditioned to allow further joint strength development. As indicated, joints of our invention reach a suitable handling strength much more rapidly.

Example 13

A belt joint, as in Example 10, was evaluated after 24 hours conditioning, 50% R.H., 70°F., for its heat resistance. In this test a 1 inch wide joint is subjected to 50 lb./in. width load in a heated chamber until the joint adhesive fails in shear.

Heat resistance was found to be greater than 390°F. These joints have been found to hold up very well in applications involving high pressures and attendant high grinding temperatures. Belt joints which fail at temperatures below about 325°F are considered unsatisfactory.

Example 14

Adhesive films were prepared in a manner as before described using the adhesive composition of Example

| Example No. | Adhesive composition | | | Minutes tested | Number of flexes[3] | Joint condition |
|---|---|---|---|---|---|---|
| | Bostik 7076 | Mondur CB75 | Thylon[1] D-406 | | | |
| 4 | 100 | 8.8 | 12.5 | [2]15 | +3,000 | Intact. |
| 5 | 100 | 8.8 | 9.5 | [2]15 | +3,000 | Do. |
| 6 | 100 | 8.8 | 4.7 | 11.5 | 2,300 | Film split. |
| 7 | 100 | 8.8 | 4.7 | 8.5 | 1,700 | Do. |
| 8 | 100 | 5.0 | 12.5 | [2]15 | +3,000 | Intact. |
| 9 | 100 | 5.0 | 9.5 | [2]15 | +3,000 | Do. |
| 10 | 100 | 5.0 | 4.7 | [2]15 | +3,000 | Do. |
| 11 | 100 | 5.0 | | 1.1 | 220 | Film split. |
| 12 | 100 | 5.0 | | 0.9 | 180 | Do. |

[1] A commercially available polyurethane prepolymer (70% solids in methylethyl ketone) having blocked isocyanate groups and an active hydrogen equivalent weight in the range 145–300.
[2] Similar results were obtained on testing a second belt joint.
[3] Tests were stopped after 15 minutes.

10 except that the amount of isocyanate components therein was varied as below indicated.

Belt joints were manufactured similar to the procedure disclosed in Example 2, heat activation and prejoining being conducted at 240°F for 3 seconds respectively. The press (8,600 lbs./in.$^2$) joining temperature was 240°F for 20 seconds. Joints were evaluated, 30 minutes after formation, in the multi-head flex fatigue. The results are given below:

| BELT JOINT NO. | GRAMS NCO PER 100 GRAMS POLYURETHANE ELASTOMER | FLEXES TO FAILURE |
|---|---|---|
| 15A | 0.54 | 2400 |
| 15B | 7.5 | 2000 |

Example 15

An adhesive film having the composition of Example 10 was used in manufacturing a belt joint in the manner described in Example 2 after the film had been stored in a plastic bag containing Drierite for more than 6 months. On testing, after 24 hour conditioning as before-described, the belt joint was found to exceed 5,000 flexes before failure.

Example 16

Adhesive films were prepared from the composition of Example 10 and partially cured at various conditions to determine the effect thereof on formation of belt joints. Belt joints were manufactured as disclosed in Example 2 except that 120X RESINALL METALITE coated abrasive material was used. Time and temperature conditions for partial curing were as indicated below:

PARTIAL CURING CONDITIONS

| TIME MIN. | TEMP. °F | FLEXES TO FAILURE |
|---|---|---|
| 10 | 275 | 1780 |
| 15 | 275 | 3240 |
| 20 | 275 | 6840 |
| 40 | 275 | 3760 |
| 50 | 275 | * |

* Film had cured to such extent it could not be tackified for joining.

Partial curing was conducted after heating the wet adhesive film for 14 minutes at 100°F and 10 minutes at 225°F.

Thus it is seen that partial curing to too great an extent can result in relatively poor joint strength or for that matter even preclude heat activation at the temperatures most desired for belt formation.

Example 17

Other adhesive compositions were prepared using the active hydrogen members indicated below in combination with the hydroxyl terminated polyurethane polyester. In each instance, the adhesive composition is based on 100 pbw BOSTIK 7076 and 4.4 pbw Mondur CB–75 unless otherwise specified.

Adhesive films were prepared as disclosed in Example 3 after which belt joints were made in accordance with Example 2 and evaluated (30 min. after formation) on the fatigue tester. The results are tabulated below.

| Example | Active hydrogen member | Active hydrogen equiv. wt. | Amount (pbw) | Flexes | Joint condition |
|---|---|---|---|---|---|
| 17 | Unithane 100 | 145–300 | $^1$4.8 | +10,000 | Intact. |
| 18 | Phenoxy PAHJ | 300 | $^2$1.75 | +12,000 | Do. |
| 19 | 4, 4' methylene -bis--(2 chloroaniline)$^3$ | 67 | 0.25 | 8,000 | Separation. |
| 20 | 1, 4 butanediol | 45 | .5 | 4,400 | Do. |
| 21 | Diethylene triamine | 20 | .067 | Impossible to form adhesive film—gelled almost immediately on adding to Bostik-Mondur. | |
| 22 | Triethylene tetramine | 24 | .08 | | |
| 23 | Poloxypropylene diamine | 58 | .2161 | 5,920 | Separation. |
| 24 | H$_2$O | 9 | .55 | 1,160 | Separation.$^4$ |
| 25 | Ethylene diamine | 15 | .05 | | Localized gelations |

$^1$ 70% solids in cellosolve acetate; 5.0 pbw Mondur CB75.
$^2$ 20% solution in methyl ethyl ketone.
$^3$ Available from E. I. DuPont de Nemours & Co. under trade-name "MOCA."
$^4$ Tested one hour after joint formation; 8.8 pbw Mondur CB75.

From the above data, one can readily see that the combination of active hydrogen components in the adhesive composition of this invention provides a joint of extremely high initial strength. Moreover, ultimate strength, i.e., after conditioning for 24 hours, 50 percent R.H., 70°F, is found to be considerably higher. In the case of Example 19 (MOCA), immediate strength, as indicated by flexes to failure, was 8,000. However, ultimate strength exceeded more than 10,000 flexes.

Athough the preformed adhesive films of our invention are particularly useful in the manufacture of coated abrasive belts, they obviously are not so limited. The adhesive films diclosed herein can also be used in the laminating together of various similar or dissimilar materials, e.g., metals such as aluminum and plastic lamina of various types, e.g., polyester films, as well as wood, cloth, and paper lamina.

As many different embodiments of this invention will appear to those skilled in the art of adhesive bonding, it is to be understood that the specific embodiments of the invention, as presented herein, are intended by way of illustration only and not limiting on the invention, but that the limitations thereon are to be determined only from the appended claims.

What we claim is:

1. Adhesive composition comprising in admixture
   1. a component having available free isocyanate groups; and
   2. a polyfunctional active hydrogen containing component consisting of, in combination,
      a. a hydroxyl terminated polyurethane-polyester having a hydroxyl number of from about 2 to about 15; and
      b. a member containing at least difunctional active hydrogen and having an active hydrogen equivalent weight in the range from about 27 to less than about 500, said available isocyanate groups being in the range from about 1.05 to about 4.3 grams and said active hydrogen member being in the range from about 0.63 to about 21 grams, respectively, per 100 grams of said polyurethane-polyester.

2. A dry, heat-activatable, preformed, adhesive film suitable for splicing together the ends of a strip of coated abrasive material in the manufacture of endless belts comprising the reaction product of the composition in claim 1 which has been at least partially cured yet remains heat-activatable at relatively low temperatures.

3. A preformed adhesive film according to claim 2 in which said active hydrogen containing member has an active hydrogen equivalent weight of from about 67 to about 300.

4. A preformed adhesive film according to claim 2 wherein the thickness of the film is at least about 1.5 mils.

5. Adhesive composition according to claim 1 wherein the at least difunctional active hydrogen member has an active hydrogen equivalent weight of at least about 145.

6. A dry, heat-activatable, preformed, adhesive film suitable for splicing together the ends of a strip of coated abrasive material in the manufacture of endless belts comprising the reaction product of a composition comprising in admixture, on a solids basis,
   a. from about 3.5 to about 36.5 percent of said composition of a component having available free isocyanate groups; and
   b. a polyfunctional active hydrogen containing component consisting of, in combination,
      1. from about 64 to about 98 percent of said composition of a hydroxyl terminated polyurethane-polyester having a hydroxyl number of from about 2 to about 15; and
      2. from about 0.4 to about 20.2 percent of said composition of a member containing at least difunctional active hydrogen and having an active hydrogen equivalent weight of at least about 145, said reaction product being at least partially cured so as to offer sufficient cohesive strength that the adhesive film in use will not unduly flow and be squeezed out from between the surfaces being joined yet can be heat activated at a temperature over a time period not resulting in damage to the joined material.

7. A dry, heat-activatable preformed, adhesive film according to claim 6 wherein the adhesive film has been partially cured by heating, after solvent removal, for from about 10 to 60 minutes at from about 300° F. to about 250° F.

8. A dry, heat-activatable preformed, adhesive film according to claim 6 wherein the member containing at least difunctional active hydrogen is a polyester-polyurethane isocyanate blocked prepolymer.

9. A dry, heat-activatable preformed, adhesive film according to claim 7 wherein the member containing at least difunctional active hydrogen is a polyether-polyurethane isocyanate blocked prepolymer.

10. A dry, heat-activatable preformed, adhesive film according to claim 7 wherein the member containing at least difunctional active hydrogen is 4,4' methylene-bis-(2 chloroaniline).

11. A dry, heat-activatable, preformed, adhesive film suitable for splicing together the ends of a strip of coated abrasive material in the manufacture of endless belts comprising the reaction product of the composition in claim 11 which has been at least partially cured so as to offer sufficient cohesive strength that the adhesive film in use will not unduly flow and be squeezed out from between the surfaces being joined yet can be heat activated at a temperature over a time period not resulting in damage to the joined material.

12. A preformed adhesive film according to claim 11 which can be heat activated in the temperature range 175°–350° F. by heating for 1–5 seconds.

13. A preformed adhesive film according to claim 12 wherein the hydroxyl terminated polyurethane-polyester is the reaction product of a diisocyanate and a hydroxyl terminated polyester of a dicarboxylic acid and a polyhydric alcohol.

14. A preformed adhesive film according to claim 12 wherein the adhesive film can be heat activated at less than 274° F.

15. Coated abrasive article comprising a backing member and having abrasive grain adhered thereto by a maker adhesive said article having two ends thereof joined in overlapped position and disposed between and in contact with said overlapped ends a cured adhesive composition, said adhesive composition in its initial state being a preformed adhesive film according to claim 10, the joined overlapped ends having an initial joint strength of as much as five times that of a joint formed with an adhesive composition not including the difunctional active hydrogen member.

16. Coated abrasive article according to claim 15 wherein the joint strength initially is only about 50 percent of that ultimately attained.

17. A preformed adhesive film according to claim 13 wherein said dicarboxylic acid is adipic acid and said alcohol is butylene glycol.

18. A preformed adhesive film according to claim 17 wherein said isocyanate component is an isocyanate terminated polyurethane reaction product of a polyhydric alcohol and an isocyanate.

19. A preformed adhesive film according to claim 18 wherein said isocyanate terminated polyurethane is the reaction product of trimethylol propane and toluene diisocyanate.

* * * * *

UNITED STATES PATENT OFFICE
CERTIFICATE OF CORRECTION

Patent No. 3,770,555            Dated November 6, 1973

Inventor(s) Matthew T. Gladstone and John F. Malloy

It is certified that error appears in the above-identified patent and that said Letters Patent are hereby corrected as shown below:

In the title, "OVERLOPPED" should read -OVERLAPPED-.

In the chart, Example 17, column 16, at line 22, "Unithane 100" should read -Unithane 200-.

Claim 1, line 17, the word -(solid)- has been left out after "100 grams".

Claim 8, line 2, "claim 6" should read -claim 7-.

Claim 11, line 5, "claim 11" should read -claim 5-.

Claim 15, line 8, the dependency should read -claim 12-, not "claim 10".

Signed and sealed this 10th day of September 1974.

(SEAL)
Attest:

McCOY M. GIBSON, JR.            C. MARSHALL DANN
Attesting Officer            Commissioner of Patents